Patented Jan. 29, 1946

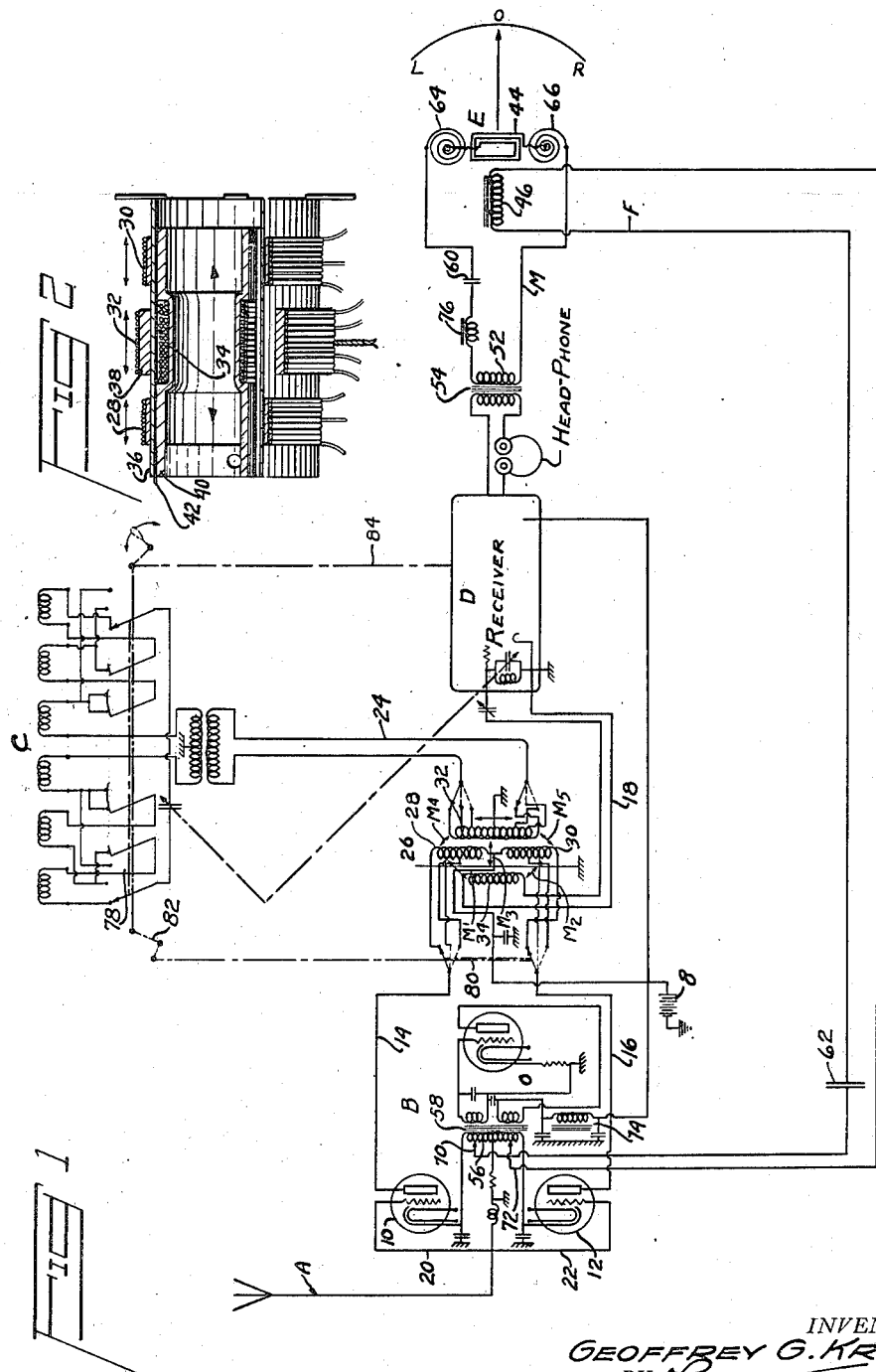

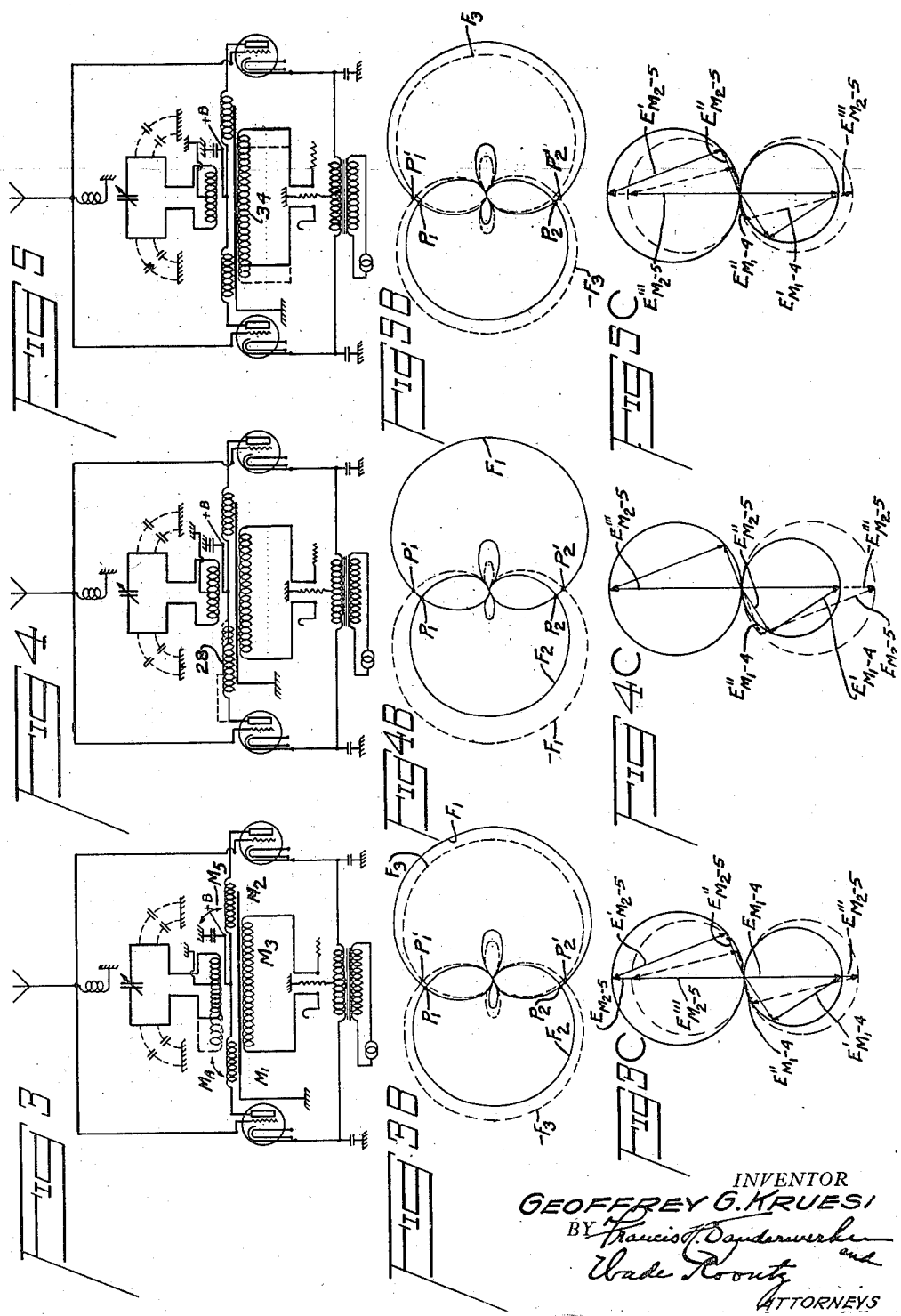

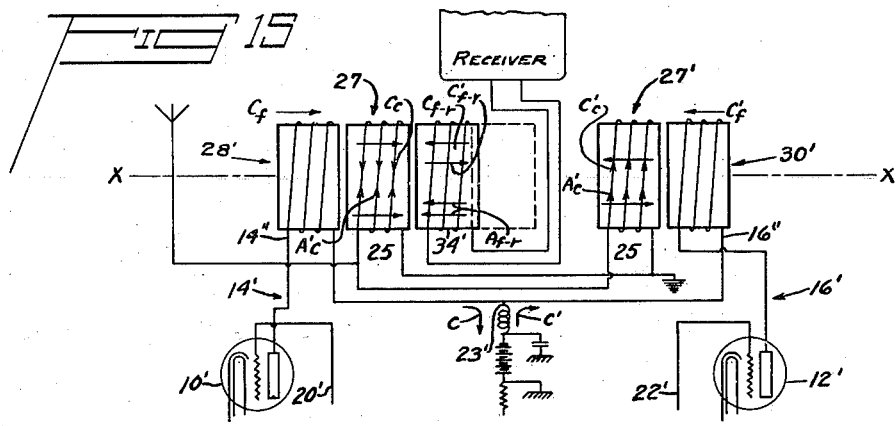
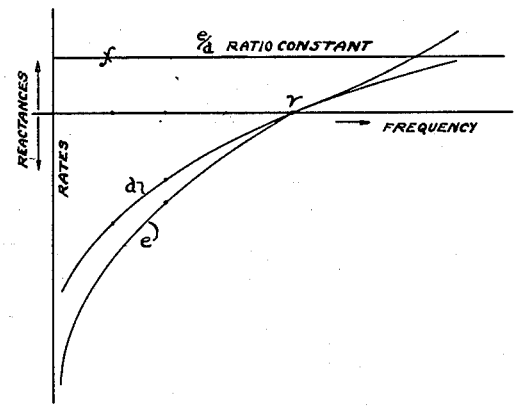
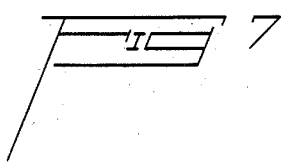
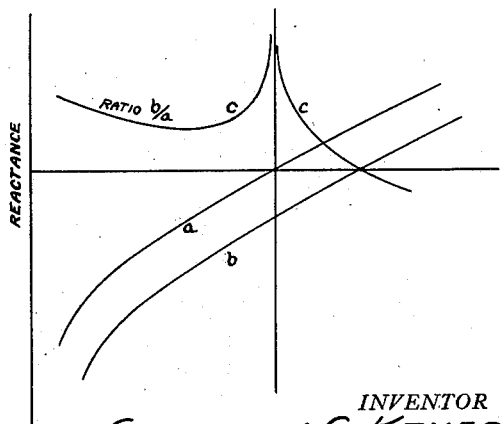

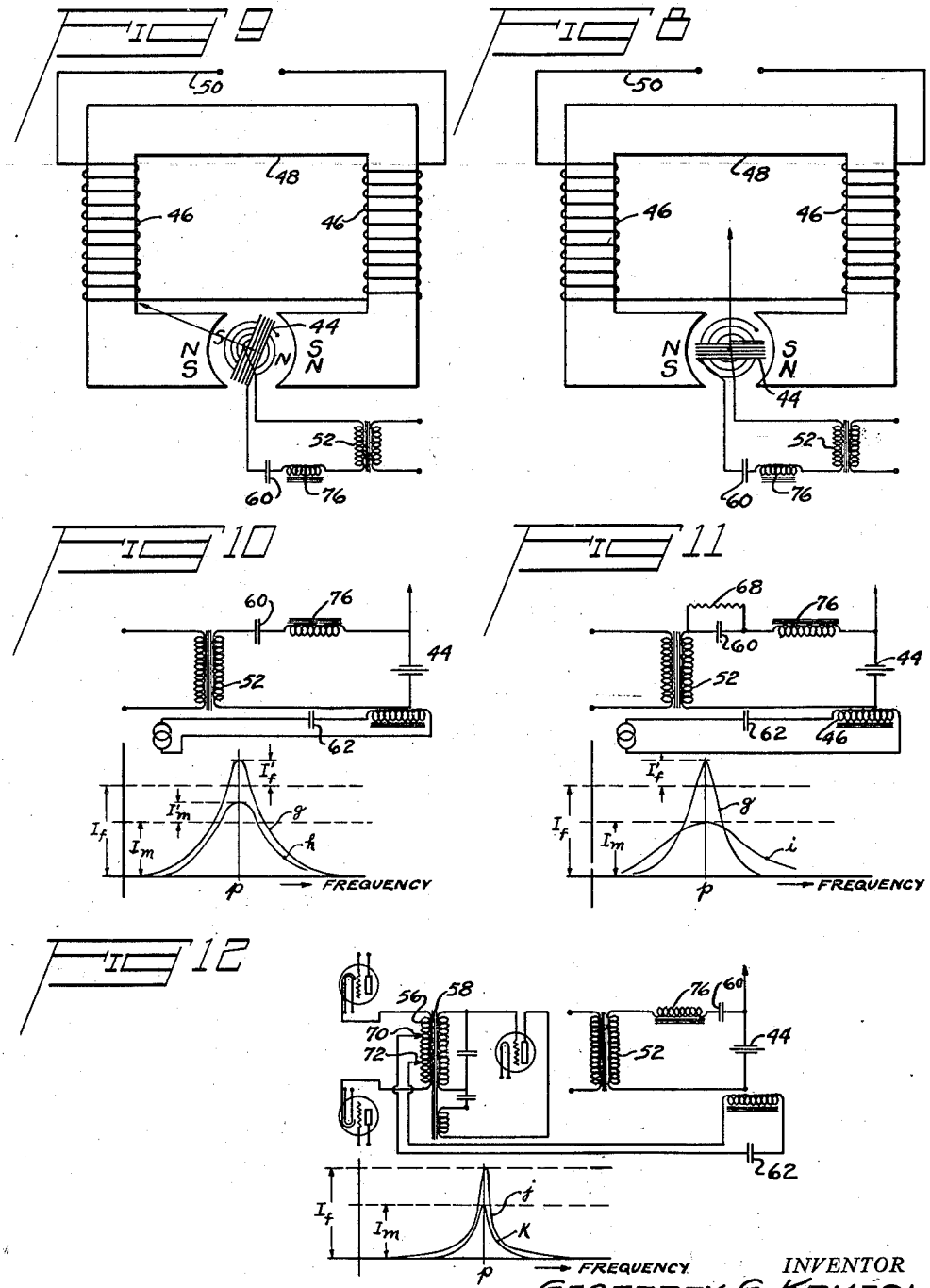

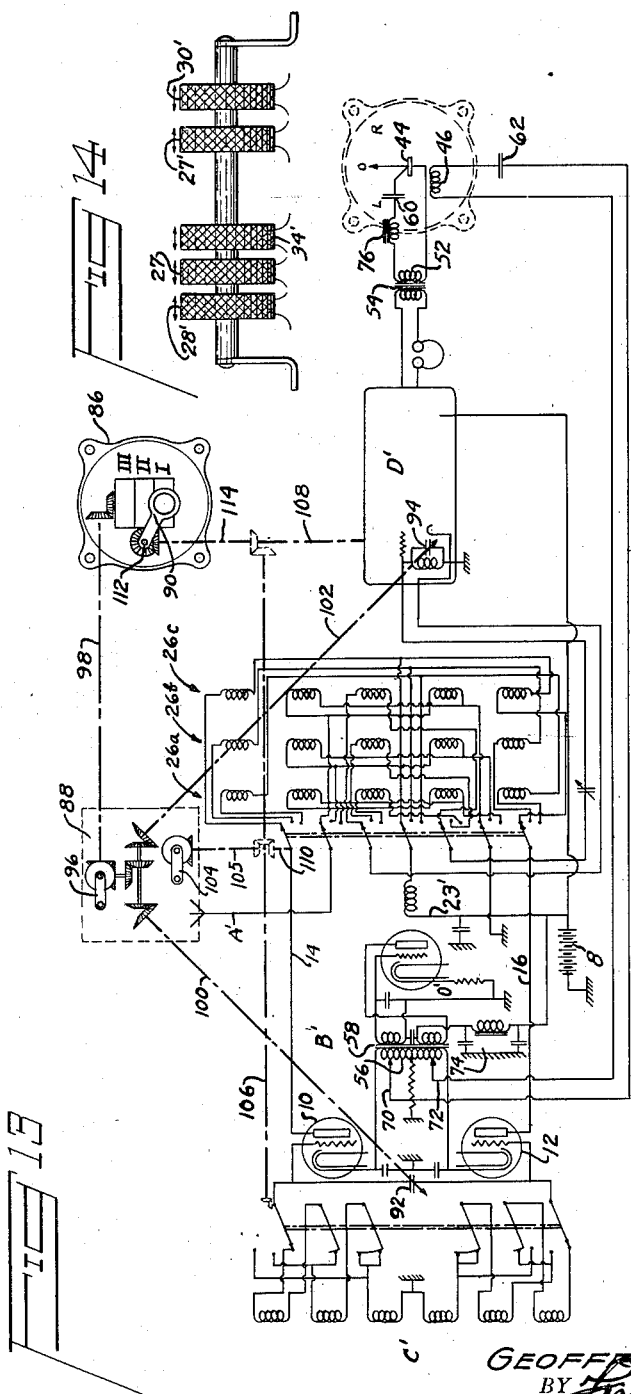

2,393,643

UNITED STATES PATENT OFFICE 2,393,643

RADIO COMPASS AND DIRECTION FINDER

Geoffrey Gottlieb Kruesi, Dayton, Ohio

Application February 8, 1935, Serial No. 5,566

34 Claims. (Cl. 250—11)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to radio compasses or kindred receiving apparatus having a directional characteristic and particularly to radio compasses of the visual bilateral type.

A number of methods of reversing the polarity of the directional antenna means in a bilateral type of compass are known. Among these are those utilizing a balanced modulator circuit with either the directional antenna or non-directional antenna (locally modulated in both cases) together with a D. C. indicating means associated with a bridge circuit, as disclosed in Patent 1,868,945, or with an A. C. indicating means as disclosed in D. V. L. Berichte, July 1927, If. 17, 1, those utilizing a push-pull circuit (electrical or mechanical) with either the directional antenna or non-directional antenna (locally modulated in both instances) together with a D. C. indicating means associated with a bridge circuit or an A. C. indicating means.

In radio compasses of the bilateral type it is highly desirable that in reversing the polarity of either the directive or non-directive antenna means characteristic, either by displacing the loop to one side or the other of the direction in which no energy is received or by alternately switching the loop effects, that the field patterns resulting from combining the current effects of said antennae be equal; so that for equal and opposite displacements of the directional antenna from the position where no energy is received, there will be effected corresponding equal and opposite deflections of the needle of the zero center indicator and for no displacement of the directional antenna from the no-energy receiving position (which is at right angles to the direction of the transmitting station) the needle should remain at zero corresponding to the true direction of the geographical bearing.

In my copending application Serial No. 699,719, now Patent No. 2,142,133, issued January 3, 1939, I have shown that where two generating circuits (one having non-directional characteristics and the other directional characteristics) are coupled to a collective circuit, a relation can be established between the coupling coefficient existing between each generating circuit and the collective circuit and between the generating circuits themselves which will permit a variation in the reactance of one of said generating circuits without materially affecting the reactance of the other of said generating circuits and which, in considering the direction of the incoming signal to be parallel with the plane of the directional generator, will allow energy transfers from said generating circuits respectively to said collective circuit that are comparable to each other and relatively large compared to the energy transfer between said generating circuits themselves. The optimum coupling coefficients between said circuits occur when the energy transfers from the generator circuits respectively to the collective circuit are equal and the coupling coefficient between the generating circuits is as small as can be made. Under these conditions the combined current effects of said generating circuits will produce an ideal cardioid and upon true reversal thereof 180° accuracy between front and rear bearings may be obtained.

It has also been shown in said application that if the coupling coefficients relation is such that between the generating circuits themselves the coupling coefficient is kept sufficiently small to permit a variation in the reactance of one of said generating circuits without materially affecting the reactance of the other of said generating circuits and if the induced e. m. f.'s in the collective circuit are of unequal amplitude, though comparable, either due to unequal coupling coefficients between the respective generating circuits and collective circuit or due to unequal generating e. m. f.'s or both, then a phase relation between current and voltage of the one can be established that will correspond to a predetermined phase relation of current and voltage of the other, but the ideal cardioid is no longer obtained. However, true reversals thereof will produce null points 180° apart.

In accordance with the disclosure in my above said copending application, a reversal of cardioid to obtain null points 180° apart is obtained by periodically reversing the phase of the current effect of the non-directive antenna means, by means of a balanced modulator circuit and the resulting field patterns are made equal by interposing variable condensers in each plate circuit for adjusting the radio frequency current of one plate circuit relative to the radio frequency current of the other plate circuit so that the respective voltages induced in the radio receiver input circuit are substantially equal and opposite.

Whereas such a balance between said radio frequency voltages induced in the receiver input circuit could be obtained for any arbitrary chosen receiver setting, it was noted that for other receiver settings a readjustment of said balancing condensers was required in order to maintain said 180° bearing relation. It was found that the readjustment had to be of considerable magnitude if the receiver setting was changed within the conventional range of frequencies employed (two to one ratio). Since the balancing condensers in order to be effective as a balancing means, had to be exceedingly small, the reactances therefore large and comparable with that of the remaining parts of the respective plate circuits, the extent to which the 180° relation could be maintained, allowing a permissible error of ±1°, was found to be insufficient for said frequency ratio of two to one. Furthermore, it is obvious that this method of balancing necessitated a reduction in the radio frequency current amplitude of the branch carrying the greater current to that of the current amplitude existing in the branch carrying the smaller current, resulting thereby in a balancing arrangement at a sacrifice in sensitivity and range.

Since it is observed that the desired 180° bearing relation is a function of frequency variation it implies that fundamentally the ratio of energy transfer between the respective plate circuit, loop circuit and receiver circuit must likewise be a function of frequency variation, and in order to assure said 180° relation, said ratio, whatever it may be, must remain the same regardless of frequency change.

The theory of coupled circuits teaches that if either or both of the circuits coupled to each other have circuit constants which make the respective circuit reactances a non-linear function of frequency then for a given mutual inductance between said circuits the coupling coefficient becomes in a similar manner a non-linear function of frequency.

The particular form of this non-linear function depends naturally upon the magnitude and character of the constants involved.

In the case where two circuit systems, alternatively operative, as for instance, one branch of the balanced modulator circuit, loop circuit and receiver circuit, as well as the other branch of the balanced modulator circuit, loop circuit and receiver circuit are employed, it follows that the constants of both circuit systems must be such as to render the coupling coefficient-frequency relation of each system similar in form so that the ratio between the two relations for any one given frequency remains the same.

Since a capacity such as employed in each plate branch circuit necessarily tends to make the total reactance involved a non-linear function with frequency, particularly so if its magnitude is comparable with the impedance of the remaining parts of the respective branch circuits, it will be realized that, although said capacity may be employed to serve for balancing purposes, its use is undesirable if such balance must be maintained over a desired range of frequencies because of the non-linear character which said capacity will impose upon and predominately affect either of the two plate circuit branches of the balanced modulator circuit in an unlike manner.

It is, therefore, desirable to establish some means to render the coupling coefficient ratio existing between two circuits independent of frequency and particularly to render the coupling coefficient-frequency relation ratio as nearly as possible constant.

Broadly, the scope of the present balancing system includes the task of eliminating undesirable capacitive, non-linear characteristics of either plate circuit for balancing purposes and to resort to a purely inductive coupling arrangement such that the mutual inductance between the one plate circuit, loop circuit, and receiver circuit, may be varied with respect to the mutual inductance existing between the other plate circuit, loop circuit and receiver circuit. This may be accomplished by differentially varying the loop coupling coil relative to the two fixed plate coils that are fixed with respect to the receiver coil, thereby effecting a balance by virtue of the plate circuit-loop circuit coupling or the loop coil may remain fixed with respect to the receiver coil and independently or differentially varying the respective plate circuit-receiver circuit couplings.

It has been shown that energy which flows indirectly from one generator to the other and from there on to the receiver circuit is not phaseable if the respective e. m. f.'s of the two generators are out of phase to begin with. If follows, therefore, that, if in a balanced modulator circuit system of this character, the loop coupling coil is used for balancing purposes, such balance is effected by balancing or unbalancing energies which flow from the respective circuit branches of the modulator circuit to the loop circuit and thereon to the receiver circuit and it proves without a doubt the existence of a coupling between the two generator circuits which, although detrimental as regards purposes of phasing between the generator circuits, may thus be used to advantage for balancing purposes.

It becomes obvious from the above considerations that the ideal coupling arrangement is that which among three circuits has only two couplings, namely, the individual couplings between the respective generator circuits and receiver circuit. This will assure absolute phaseability of the e. m. f.'s of the two generator circuits. Likewise, it becomes obvious that, in the absence of any direct coupling between the two generator circuits or where the plate circuit-loop circuit coupling is negligible, a balance can no longer be effected by balancing the respective couplings between the two generator circuits. The ideal balancing arrangement, therefore, is the one which has a fixed coupling between one generator circuit and receiver circuit and independently variable couplings between the respective plate circuits of the balanced modulator and receiver circuit. To this end and in accordance with the present invention, means is provided to reduce to a minimum any variation in the coupling between the generator circuits of a circuit system of this character, it being understood that a mutual relationship between the two generator circuits is naturally bound to exist for purely physical reasons, if said generators are to feed energy into the same receiver circuit.

Since it is a characteristic of circuit systems of this character that a locally produced current of given frequency and constant amplitude or its effect, must combine with a detected current or its effect (due to local modulation) of like frequency, whose amplitude and phase vary in accordance with the deviation of the directional antenna from the direction of the incoming signal, it must follow that the only useful detected currents or their effects are those which have a frequency that corresponds to the locally produced frequency, and that all currents of other frequencies are not of a useful nature in that they do not contribute to the efficiency of the indicating means. It has been found that when these undesirable frequencies are of an irregular nature, the resultant current effects produced in the indicating means between the locally produced current and these undesirable currents respectively will have correspondingly irregular amplitudes for any given position of the loop, thereby producing fluctuations of the indicator needle. This is highly undesirable where any given position of the loop is intended to give an accurate bearing indication.

The possible sources of irregular frequencies that may be introduced in systems of this character through the antennae may be defined as follows:

(1) Frequencies introduced at the transmitting station (voice modulated carrier).
(2) Irregular frequencies caused by natural static disturbances.
(3) Irregular frequencies caused by local man-made static disturbances.

Each of these latter two frequencies is receivable by the antennae, indicating that they must be considered as radiation of a radio frequency character. But, whereas the frequencies indicated in group (1) consist essentially of a single voice-modulated carrier frequency, those frequencies indicated in (2) and (3) are of a transient character and can be interpreted by the method of Fourier as an infinite band of frequencies. In this band there is a component for every possible frequency, although an individual component may have an infinitesimal amplitude. Within any band accepted by a receiver, a certain proportion of the total energy will be located. The narrower the band accepted, the less will be the static disturbances. However, the width of the band is necessarily dependent upon the character of the signal desired.

It has been discovered that in circuit systems of this character, with the directional antenna disposed in the direction in which no energy is received, when the antennae are associated with the receiver in such a manner that the modulated carrier is not eliminated, the indicating means will be affected by audio frequency output currents of frequencies and amplitude which result; firstly, from the modulation products formed between each and every frequency contained in the transmitted signals and the locally produced modulation frequency, and secondly, from the modulation products formed between the carrier and each of the frequencies contained in said modulation products (locally produced) as well as the demodulation products formed between each modulation product and every other. This is due to the fact that voice modulation or any other audible interference frequencies are readily detectable in the receiver in the presence of the carrier and these detected currents, because of their irregular character, will affect the needle indication of a D. C. instrument, used in connection with a bridge circuit, in a correspondingly irregular manner and, in the case of an A. C. type indicator that is associated with a local oscillator, will produce a correspondingly irregular indication. Thus, the relative deflections of both types of indicators will be unstable under these conditions (but as will be hereinafter pointed out, not to the same extent).

It has also been discovered that in circuit systems of this character, when the directional antenna is disposed in the direction in which no signal energy is received and the antennae are associated with the receiver in such a manner that the modulated carrier is eliminated, the indicator means will also be affected by audio frequency output currents of frequencies and amplitudes which result; firstly, from the modulation products formed between each and every frequency contained in the transmitted signal and the locally produced modulation frequency, and secondly, from the modulation products formed between each modulation product (locally produced) with every other, but will not be affected by any demodulation products, which would be formed between a carrier and each of the frequencies contained in said modulation products locally produced, if a carrier were present. Thus, it will be seen that when the carrier is eliminated, there will be present in the indicating means a lesser number of demodulation products and the indicating instrument will be less likely to be affected.

It is furthermore well known that the steadiness of the indicating needle for any given position of the directional antenna depends upon the ratio of the received signal strength to the existing electrical noise level. It has been found that when a balanced modulator circuit is employed in a radio compass of this character that the needle deflections remain substantially steady provided that the electrical noise level does not exceed in intensity that of the received radio frequency signal strength. When, however, the received signal strength is weaker than the existing electrical noise level, the needle deflections will become unsteady.

However, it will be apparent that any indicating instrument that is responsive to all undesirable frequencies and which may be employed with a radio compass circuit system of this character, regardless of whether the modulated carrier is present or eliminated, will function properly only for signal to noise ratios, which are large. This is extremely disadvantageous, particularly for long distance reception where small values of signal to noise ratios are invariably the rule.

It is, therefore, a further object of the present invention not only to eliminate as many as possible of these undesirable frequencies, but also to reduce to a practical minimum the effects of those undesirable frequencies that are not eliminated.

Broadly, this is accomplished by providing in a radio compass of this character an indicating means which is responsive only to a channel of frequencies, the band width of which is materially narrower than that embraced by the interfering frequencies.

The diagrams used herein to illustrate the various current characteristics are merely illustrative and are not to be considered as drawn to exact scale or with mathematical exactitude.

Fig. 1 is a circuit diagram of a direction finder embodying the invention.

Fig. 2 is an elevational view in quarter section of the mixing transformer employed in the circuit of Fig. 1.

Figs. 3, 4 and 5 show diagrammatic circuits of the circuit system shown in Fig. 1, each view showing in dotted line a variation in the manner of obtaining the desired balanced electrical relation.

Figs. 3B, 4B and 5B show field patterns corresponding to the solid and dotted line positions of adjustment in each of the corresponding Figs. 3, 4 and 5.

Figs. 3C, 4C and 5C show in solid lines vector diagrams of the induced e. m. f. components in the receiver circuit during successive half cycles of commutation of the balanced modulator device and in dotted lines the variation in these e. m. f. components for corresponding adjustments shown in Figs. 3, 4 and 5.

Figs. 6 and 7 show characteristic curves of the reactance values of the respective plate circuits of a balanced modulator device that have respectively equal and unequal LC products.

Fig. 8 is a circuit diagram of the indicating device with the electrical constants of the circuits properly adjusted for normally maintaining the indicator pointer in the zero center position.

Fig. 9 is a view similar to Fig. 8 showing the pointer abnormally displaced.

Fig. 10 shows a circuit diagram of the moving coil circuit and the field coil circuit of the indicator and a corresponding diagram showing their respective characteristics.

Figs. 11 and 12 show variations of the circuit shown in Fig. 10 together with corresponding variations of the diagram shown in Fig. 10 for obtaining the desired normally balanced position of the indicator needle.

Fig. 13 shows a circuit diagram of another type of direction finder.

Fig. 14 is an elevational detail view of the type of mixing transformer employed in the circuit of Fig. 13.

Fig. 15 is a simplified form of a portion of the circuit shown in Fig. 13 with parts in different positions as indicated by solid and dotted lines corresponding to inoperativeness and operativeness of the modulator device respectively.

Fig. 16 is a simplified circuit diagram of the circuit system shown in Fig. 13 with the antenna circuit shown in its electrical equivalent form.

The system embodying the invention as herein described and illustrated in Fig. 1 of the drawings includes a non-directional antenna A for receiving a modulated or non-modulated carrier; a balanced modulator of the conjugate type B to produce non-directional side band frequencies by a low frequency local ocillator O; a directional antenna C for furnishing a directional modulated or non-modulated carrier; a receiver D to collect and combine said non-directional side bands with the directional carrier and to derive the low frequency current component having directional characteristics; and an indicating device E to indicate said directional properties of the detected low frequency current.

The balanced modulator B is an electrical instrumentality of construction and mode of operation well known in the art. The two vacuum tubes 10 and 12 of this device have their respective plate circuits 14 and 16 coupled to the input circuit 18 of the receiver D and their input or grid circuits 20 and 22 to the non-directional antenna A. The plate circuits 14, 16 and the input circuit of the receiver are coupled to the directional antenna through a transmission line 24. The plate circuits, the receiver input circuit and the loop circuit are coupled together by means of a mixing transformer 26 consisting of three primary coils 28, 30 and 32 and a secondary coil 34.

In order that the phase of the current of the directional antenna and that of the non-directional antenna may be capable of being relatively varied without materially affecting one another consistent with obtaining maximum allowable energy transfer from said antenna to the receiver, the plate coils 28, 30 and the loop coil 32 are physically and electrically arranged with respect to each other and with respect to the receiver input coil 34 in such manner that the two couplings $M_1$ and $M_2$ are comparable in magnitude to the coupling $M_3$ (for obtaining true reversal of an ideal cardioid they are made equal to $M_3$) and the magnitude of couplings $M_4$ and $M_5$ are made as small as practically possible. (See my copending application Serial No. 699,719.)

Fig. 2 illustrates one type of mixing transformer that may be employed in this system. The primary coils 28 and 30 are arranged on opposite sides of the primary coil 32 and in concentric and parallel, spaced relation with one another. Each coil is wound upon a form that is axially adjustably mounted upon a cylindrical support 36, the diameter of the loop coil form 38 being slightly greater than those of the plate coils. The secondary coil 34 is telescopically arranged within the primary coils and is wound upon a form 40 that is arranged within the support 36 and axially adjustable relative thereto. The number of turns and the relative physical spacing of said primary coils and secondary is such that an optimum coupling coefficient relation for a given frequency is obtained in the manner described in my above-referred-to co-pending application. Each of the plate coils and the loop coil of this particular mixing transformer is provided with sets of tap connections embracing a desired number of turns for obtaining the desired optimum coupling coefficient for corresponding frequency ranges.

An electrostatic shield 42 may be provided between the form 40 and the support 36. This shield will serve in a measure to overcome such inherent unbalancing effect that the receiver circuit may have upon the plate circuits of the modulator device, but there will still be present an inherent unbalance, particularly due to unequal amplification factors of the two tubes 10 and 12.

Each of Figs. 3, 4 and 5 show in full lines physically symmetrically-arranged circuit systems that are inherently unbalanced. It will be seen that, in each of these systems phaseable and non-phaseable e. m. f. components will be induced in quadrature into the receiver circuit from one plate circuit of the balanced modulator that will be greater in magnitude than the corresponding phaseable and non-phaseable components produced by the other plate circuit, Figs. 3C, 4C and 5C. For example, in Fig. 3C, the vector $E_{M1-4}$ and its phaseable component $E'_{M1-4}$ and non-phaseable component $E''_{M1-4}$ are smaller than vector $E_{M2-5}$ and its phaseable component $E'_{M2-5}$ and non-phaseable component $E''_{M2-5}$, thereby resulting in an inequality of the corresponding field patterns $F_1$ and $F_2$ in Fig. 3B and in a front-and-rear bearing relation $P_1$ and $P_2$ respectively, which is other than the desired 180° relation.

Since the phaseable and unphaseable e. m. f. components are induced in the receiver circuit from the loop via the loop circuit 24 and from the plate coils directly, a differential variation may be made between the magnitudes and phase relations of the e. m. f. components produced by the respective plate circuit branches by moving the loop coil 32 axially either toward one plate coil or the other, as shown in dotted lines in Fig. 3, until the resultant induced e. m. f.'s, $E'''_{M2-5}$ and $-E'''_{M2-5}$ of the corresponding plate circuit branches will have equal amplitude and opposite phase. Thus, there will be produced field patterns $F_3$ and $-F_3$ shown in dotted lines in Fig. 3B that will have points of intersection P'₁ and P'₂ substantially 180° apart.

Equal and opposite e. m. f. components may be induced in the receiver circuit by independently moving one of the two plate circuit coils, as for example, coil 28, as shown in dotted lines in Fig. 4, and leaving the remaining coils relatively fixed and symmetrically arranged. The vector diagram for this relation is shown in Fig. 4C. In this view the phaseable and non-phaseable components E'$_{M1-4}$ and E''$_{M1-4}$ are respectively increased in magnitude to that of the phaseable and non-phaseable components E'$_{M2-5}$ and E''$_{M2-5}$ resulting in a vector $-$E'''$_{M2-5}$ that is equal in magnitude to the vector E'''$_{M2-5}$ and consequently in an enlargement of the field pattern F₂ to that of field pattern $-$F₁ shown in dotted lines in Fig. 4B with the result that their points of intersection P'₁ and P'₂ are 180° apart.

A further method for varying the e. m. f. components that are induced in the receiver circuit is shown in Fig. 5, wherein the receiver coil 34 is adjusted axially for obtaining the desired equal and opposite effects or balance. In accordance with this embodiment, a differential variation is obtained between the e. m. f. components induced in the receiver circuit by the currents flowing in the respective plate circuits and loop coil during successive half cycles.

Referring to Fig. 5C, it will be seen that the phaseable and non-phaseable e. m. f. components E'$_{M2-5}$ and E''$_{M2-5}$ have been reduced in magnitude, while the phaseable and non-phaseable e. m. f. components E'$_{M1-4}$ and E''$_{M1-4}$ have been increased in magnitude so that the resultant vectors E'''$_{M2-5}$ and $-$E'''$_{M2-5}$ are made equal in amplitude and opposite in phase. The corresponding field patterns F₃ and $-$F₃ are now substantially equal and opposite during two successive half cycles and the points of intersection P'₁ and P'₂ are 180° apart.

In order that the ratio of the coupling coefficient of one plate circuit to the receiver circuit as compared to the coupling coefficient of the other plate circuit with the receiver circuit be substantially constant practically throughout the frequency ranges, conventionally employed in receiver circuit design, the LC product of the one plate circuit should be equal to that of the other so that their respective reactance characteristics have a common point of resonance.

In my co-pending application Serial No. 699,719 condensers were employed in each plate circuit branch to bring about an equal transfer of energy between the respective plate circuit branches and the receiver circuit. Since the respective inductances contained in the two plate circuit branches were the same and the capacity values, which the balancing condensers had to assume to bring about equal and opposite induced voltages in the receiver circuit were not the same, the respective LC products of the plate circuit branches were not alike and therefore could not have equal resonance characteristics. Thus, while it would be quite possible to bring about a balance of said induced antenna voltages in the receiving circuit for one given frequency, this balance would be destroyed no sooner than this frequency is varied, since the ratio of the respective plate circuit reactances is no longer the same, as shown in Fig. 7 by the reactance ratio curve CC of the respective plate circuit reactance curves a and b.

Referring to the diagram shown in Fig. 6 the curve d represents the reactance characteristics of one of the two plate circuit branches and the curve e represents the reactance characteristics of the other. These curves intersect in a common point of resonance for said circuits at r. The line f represents the ratio relation of the reactance curve 2 to the reactance curve d. It will be seen that said relation remains constant throughout the frequency range.

The particular translating device E employed for indicating the direction of the source of the signal received is of the well-known electrodynamometer type, having a movable coil 44 and a fixed coil 46, that are associated with each other in a manner well known for indicating the phase and amplitude relation between the currents flowing in the respective coils. The device, as shown in Figs. 8 and 9, comprises a laminated iron core 48 and a core winding 50, which constitute an electromagnet suitable for alternating current. The moving coil 44 is rotatable about a laminated core (not shown). As shown in Fig. 1, moving coil 44 has its terminals connected in series with a secondary 52 of an audio frequency output transformer 54. The field coil 46 has its terminals connected in series with the secondary winding 56 of an oscillation transformer 58 that is a part of the low frequency oscillator O. The moving coil circuit M and the field coil circuit F are electrically isolated. The instrument not only constitutes a phase indicating device, but also a very selective device with regard to frequency discrimination of the currents flowing through the respective coil circuits.

Assuming a current of given frequency to flow through the moving coil and if the frequency of the current flowing through the fixed coil or field coil be varied from frequency values below that of the moving coil to frequency values above that of the moving coil, a torque will be produced only when the frequency of the current in the field coil circuit is substantially equal to that of the moving coil circuit. The degree of this frequency discrimination is determined by the nature and magnitude of the electrical constants of both the moving coil circuit and the field coil circuit.

It is found that unusually large voltages are required for field excitation where extreme sensitivity is desired due to the usually high impedance of the field coil of such an instrument. To overcome this undesirable feature, the field circuit is tuned as nearly as possible to resonance, thereby reducing the otherwise extremely high impedance to the effective A. C. resistance which is well known to be predominantly small in the case of resonance. It is also known that the effective A. C. resistance of the field circuit depends upon the absolute value of the resonance frequency and therefore it becomes desirable to choose a low frequency, however, consistent with steady needle indication, because, if the frequency were chosen too low, the mass of the moving element of the indicator would naturally tend to vibrate in accordance with the low frequency torque produced. Also a reduction of such A. C. resistance results in increase of selectivity since the broadness of the resonance curve of the field coil circuit is determined by the amount of resistance which the circuit contains. Furthermore, harmonic frequencies present in the field coil circuit which might be of the same order as the undesirable frequencies in the moving coil circuit will, if said undesirable frequencies are comparable and of an irregular nature, produce a torque, whence the resulting indication will be of an irregular unsteady character.

By electrically tuning the moving coil and the field coil circuits to resonance by means of condensers 60 and 62 respectively and keeping the effective A. C. resistance of both circuits and the eddy and hysteresis losses of the laminated iron cores of said coils at a minimum, a very selective indicating device is obtained, and the instrument becomes responsive substantially to a single frequency provided the excitation e. m. f. of the field coil circuit is of pure sine wave character under the load condition to which the local oscillator is subjected. Thus the instrument will be responsive out of all the various frequencies existing in the moving coil circuit to substantially only a single frequency such as the useful frequency locally produced and existing in the field coil circuit. The sharper the electric resonance characteristics of the moving coil circuit and the field coil circuit, the more effectively responsive will be the instrument to said single frequency.

It has been found that there is an optimum degree of field excitation, which will result in the maximum efficiency obtainable.

It is well known in instruments of this character that normally and in the absence of any detected current flowing in the moving coil circuit, a transformer action will exist between the field coil and the moving coil if the plane of the moving coil is not parallel with the lines of force of the field coil. In order to maintain this action at a minimum, consistent with having very weak springs, it is necessary to limit the effectiveness of the field excitation to that which produces a magnetic moment that is less than the torque set up by the springs for all operative positions of the moving coil.

Referring to Fig. 1, it will be seen that the needle of the moving element is normally held in a center position by the use of two oppositely wound hair springs 64 and 66, that are connected in series on opposite sides of and with the moving coil 44. It is customary practice to make the two hair springs physically as nearly as possible alike.

Referring now to Fig. 10, curve $g$ represents the field excitation characteristic with respect to a variation of the local oscillator frequency. Curve $h$ represents the moving coil current which is due to said field excitation as the local oscillator frequency is varied. $I_f$ and $I_m$ are permissible field excitation and induced moving coil excitation at the point of resonance P, it may be seen that the field excitation at point P exceeds the permissible value of $I_f$, which in turn produces a corresponding excessive moving coil current represented by $I'_m$ with the result that the product of said excessive field and moving coil currents will set up a torque that exceeds that of the hair springs, thereby causing the indicator needle to deviate from its zero center position, as indicated in Fig. 9.

Referring now to Fig. 11, it will be seen that the moving coil current characteristic with variation of the local oscillator frequency is represented by curve $i$, whereas the field excitation characteristic $g$ is the same as in Fig. 9. The moving coil current characteristic has a limited amplitude at the point of resonance P and is equal to $I_m$. This limited amplitude is due to the application of a resistance 68, which is connected across condenser 60 with the result that the combined effects of the maximum amplitude of the field current with said limited amplitude of the moving coil current, both at the point of resonance $p$ will produce a torque which is less than that of the hair springs and the indicator needle will thus remain at its center position as indicated in Fig. 8. It will be seen that this result has been obtained with a sacrifice in the sharpness of the moving coil current characteristic from a comparison of characteristic $i$ with characteristic $h$ in Fig. 10.

Referring now to Fig. 12, the field excitation with its corresponding moving coil current amplitude has been reduced by limiting the applied A. C. voltage of the field coil circuit by providing taps 70 and 72 on the secondary winding 56 of the oscillating transformer 58 with the result that the original sharpness of both field coil current and moving coil current characteristics is retained as indicated by curves $j$ and $k$ respectively. It will be seen that the maximum amplitudes of said curves at the point of resonance P is within the permissible values $I_f$ and $I_m$ respectively with the desired result that the indicator needle will remain at its zero center position, as indicated in Fig. 8.

It has been found that currents of the frequency locally produced by the oscillator O will leak into the detector circuit by virtue of a common power supply between the modulator circuit and receiver circuit, such power supply being illustrated in Fig. 1 as a battery 8. This current is introduced into the moving coil circuit and because its amplitude is comparable to the amplitude of the useful currents will cause the indicating instrument to give false indications. To reduce the leakage to a practical minimum a well-known filter circuit 74 tuned to the frequency of the local oscillator O is connected in series with the plate circuit of said oscillator as shown.

It is found by experiment that unequal phase variation in the moving coil and field coil circuits, due to variation of the oscillator frequency will be indicated by the instrument and consequently affect the true bearing indication. Such variations in frequency do exist for the simple reason, as on an aircraft for instance, during high speed and idling speed the battery voltage suffers a considerable change, thereby affecting the speed of the receiver dynamometer (not shown) and consequently its output to the directional receiving system. To overcome this disadvantage, precautions must be taken to make the phase variations that occur in the one circuit to correspond with those of the other circuit. This is accomplished by choosing electrical constants for both coil circuits so that the ratio of inductive reactance to resistance or capacitive reactance to resistance is the same in both the moving coil circuit and the field coil circuit regardless of change of the local oscillator frequency. For this purpose and as illustrated herein, a reactor 76, (see Figs. 1 and 8) is provided in the moving coil circuit and is connected in series with and between the condenser 60 and the coil 52.

It will be readily understood by those skilled in the art that certain of the above features disclosed in connection with the particular indicating instrument illustrated herein are also applicable to a D. C. type indicator.

It will be seen by referring to Fig. 1, that the loop circuit and the mixing transformer are each provided with switching means 78 and 80 respectively, that are connected to each other through a link connection 82 and to a switching means (not shown) in the receiver through a link connection 84 so that the proper number of turns in each of the primary windings 28, 30 and 32 of the mixing transformer is selected to correspond with the proper number of turns of the loop windings and receiver transformer windings (not shown) for the particular frequency range desired to be employed. It will be seen that with these switching means so connected, a simultaneous change can be effected for the loop, the receiver and the mixing transformer by operating a manual control device, remotely positioned if desired, to select at will only one of the plurality of frequency bands for which the apparatus is adapted and over which it is desired to receive.

Where a single mixing transformer is employed for all frequency ranges, as is the case in Fig. 1, the number of turns of each of the mixing transformer windings must be predeterminately chosen for each frequency range so that the desired antenna coupling coefficient relations between the respective plate circuits and the loop and receiver circuits is maintained substantially over the entire band of each frequency range.

In the circuit system shown in Fig. 13, the devices employed for obtaining a directional indication are similar in their general character to those shown in the system in Fig. 1. The former system is distinguished from the latter in that the directional antenna C' is associated with the input of the balanced modulator device B' and the non-directional antenna A' is associated with the output of said modulator device, which in the present instance is of the common input type, to thereby produce locally modulated side band frequencies of directional character; in that the non-directional antenna A' which furnishes the carrier for said directional side band frequencies is provided with antenna coupling coils that are associated with the output coils of the modulation device for inducing directional bands therein and for transferring the same to the receiver device. In obtaining a balance of energy transfer to the receiver device with the use of this type of balanced modulator, individual mixing transformers are provided for each frequency range to which the receiver is adjustable and tunable and to which the loop circuit is correspondingly adjustable and tunable, instead of a mixing transformer provided with taps for this purpose.

It is well known that a balanced modulator circuit will suppress the carrier frequency leaving isolated the side band frequencies. In the common input type of balanced modulator circuit, the carrier frequency is suppressed in the mid branches of the input and output circuits by virtue of the fact that, in the absence of a common modulator potential in the grid circuits, the carrier input potentials in said grid circuits being of opposite polarity will cause carrier currents to flow in the two respective plate circuits that are, when considered in the mid branch, of opposite phase, but not necessarily of equal, amplitude. When the said carrier current amplitudes are equal the resulting carrier current in the mid branch is suppressed. In the presence of the common modulator potential in the grid circuits, the two side band frequencies will be present in the mid branch and the carrier suppressed. The amplitude of the side band frequencies will be dependent upon the magnitude and phase of the carrier current potentials in the grid circuits which potentials in turn are a function of the sense and magnitude of deviation of the plane of the loop antenna with respect to the incoming carrier.

Since these directional side band frequencies coming from their respective plate circuits flow through the mid branch during two successive half cycles it is obvious that if their amplitudes are unequal and the combined effects of their respective currents with that of the antenna current are unequal, correspondingly unequal e. m. f.'s will be induced in the receiver coil of the receiver circuit.

In order to obtain in this type of circuit, the desired balance of energy transfers to the receiver circuit, provision must be made to vary the coupling coefficient relations between the respective plate circuits and their associated circuits during the two successive half cycles. This is accomplished by providing an independent coupling means between the side branches of the plate circuits and reversing the current flow in one side branch with respect to the current in the other so that said coupling becomes the equivalent in character to the mutual mid branch coupling between the two side branches.

For this purpose, and as shown in Fig. 15, the side branches 14" and 16" of the respective plate circuits 14' and 16' are provided with self inductances 28' and 30' that are wound in the same sense and direction with respect to their common field axis X—X; the one coil, that is coil 28' having its terminals reversed with respect to those of the other coil 30' to produce fields of opposite polarity coupled to these coils. These coils are inductively coupled to each other and to the receiver circuit through a coupling circuit 25 having coupling coils 27 and 27' that are coupled in series relation and are arranged between the respective plate coils and the receiver coil 34'.

It will be seen that, with the two plate coils 28' and 30', as well as coils 27 and 27', symmetrically arranged to either side of the receiver coil and the receiver, as shown in the dotted position, if a balanced condition exists in the grid circuits and in the vacuum tubes 10' and 12' with the tubes having equal amplification factors, the respective carrier current flows in the said side branches 14" and 16", will produce fields $C_f$ and $C'_f$ that are opposite in magnitude and direction at any instant. By virtue of the fact that these fields are interlinked with coils 27 and 27', there will be produced current flows in said coils that have the sense as indicated by arrows $C_c$ and $C'_c$, which in turn will produce fields $C_{f-r}$ and $C'_{f-r}$ in the receiver coil 34', that are opposite in magnitude and direction to each other at any instant. Thus, because of the balanced condition assumed and the symmetrical relation of said coils, the induced e. m. f.'s of the plate coils and coupling coils induced in the receiver coil will be equal and opposite to each other with the result that no carrier e. m. f.'s are induced in the receiver coil. Similarly, under these conditions when the modulating potential is applied, no side band frequencies e. m. f.'s will be present in the receiver coil by reason of the fact that for successive half cycles of commutation the induced side band frequencies in the coupling coils 27 and 27' will produce equal and opposite effects in the receiver coil.

Since it is desired to transfer the side band frequencies into the receiver coil during successive half cycles of commutation, it will be obvious that the coils 27 and 27' must be differentially displaced relative to the receiver coil as is shown by the solid line position of the receiver coil (see Fig. 15). with respect to said coupling coils. In this position there will be a resultant e. m. f. of side band frequencies induced in the receiver coil equal to the difference of the individually induced side band frequency e. m. f.'s in the receiver coil. The polarity of such resultant e. m. f.'s will depend upon which of the two coils will have the predominating effect over the other in the receiver coil. In order that the mutual coupling relation between the plate coils be maintained as tight as practically possible, said plate coils and their corresponding coupling coils are positioned closely adjacent each other and to effect the desired differential for obtaining the differential resultant e. m. f., the receiver coil is displaced a sufficient amount with respect to the coupling coils 27 and 27'. This will induce a differential carrier into the receiver system, which, however, practical experience has not shown to be harmful as far as sensitivity and steadiness of the visual indications are concerned.

Assuming the amplification factor of one of said vacuum tubes to be materially greater than that of the other, or assuming one grid input circuit to be unbalanced with respect to ground or any other unbalanced condition that may exist, as, for instance, in the low frequency oscillator circuit O', it will be seen that it becomes necessary to decrease the coupling between the one plate coil and its corresponding coil with respect to the coupling of the other plate coil and its corresponding coupling coil in order to obtain equal and opposite directional side band frequency effects in the receiver coil. This is illustrated in Fig. 14 wherein the coils 27' and 30' are shown spaced further apart than the coils 28' and 27 for obtaining the desired balance; it being assumed that the greater energy transfer is being derived from the plate circuit 16'. The extent of separation depends, of course, upon the degree of the difference between their respective energy transfers.

The antenna circuit A' is coupled to the coupling coils 27 and 27' in parallel. The electrical equivalent circuit A'', shown in Fig. 16, for the antenna circuit A' is well known and, therefore, should not require detail description thereof. Since the antenna circuit is of a highly capacitive nature with a correspondingly high impedance value and since the impedance of either of the two coupling coils 27 and 27' is exceedingly low it can be seen that the apparent close coupling effects between plate coils 28' and 30' and coupling coils 27 and 27' is compensated for by the existing extremely loose coupling between the antenna circuit proper and said coupling coils 27 and 27'.

A combined range and frequency indicating device 86 (see Fig. 13) is operatively associated with the receiver device D', the mixing transformers 26a, 26b and 26c and the loop device C' through a remote controlled unit 88 to indicate visually the frequency calibrated in k. c. and to indicate visually the frequency range to which the receiver mixing transformer and loop coils may be adjusted. Simultaneous operation of the dial 90, and loop and receiver tuning condensers 92 and 94 arranged respectively within the loop and receiver circuits C' and D' is obtained by means of a turning crank 96. This crank is disposed in the control unit 88 and is connected to said dial and condensers through control shafts 98, 100 and 102, simultaneous switching of the loop coils, receiver coils (not shown) and mixing transformer coils is obtained by control lever 104, which is also in the control unit and which is connected respectively to said coils through suitable shaft connections 105, 106, 108 and 110. The lever 104 is also connected to a range indicator 112 through shafts 105, 106 and 114.

Although the invention is more particularly described in connection with a radio receiving system, the principles involved may be applied to any amplifying system wherein the use of the invention is found to be desirable.

Having thus described my invention, what I claim is:

1. In an antenna system, an antenna circuit having a self-inductance, a balanced modulating circuit characterized by the fact that the carrier frequency is substantially suppressed and having a self-inductance in each branch of its output circuits, and a collective circuit having a self-inductance, said antenna and collective circuit inductances being coupled in variably adjusted relation with respect to each other and in differentially adjusted relation with respect to said branch circuit inductances whereby the combined effects in the collective circuit of one branch and said antenna circuit is made substantially equal to that of the other branch and said antenna circuit.

2. In a directional receiving system, antenna means, a source of modulating energy associated with said antenna means for periodically reversing the current effects of said antenna means, a receiving circuit coupled to said antenna means, an indicator operatively responsive to said antenna effects, a circuit connecting said indicator to the output of said receiving circuit, and a circuit for transmitting current from said source to said indicator, the ratio of reactance to resistance of the electrical constants in one of said circuits being equal to that of the other whereby no change in indication of said indicator will occur with frequency variation in said modulating source.

3. In a directional receiving system, antenna means, a source of modulating energy associated with said antenna means for periodically reversing the current effects of said antenna means, a receiving circuit coupled to said antenna means, an indicator operatively responsive to said antenna effects, a circuit connecting said indicator to the output of said receiving circuit and being tuned to the frequency of said modulating energy, and a circuit tuned to the frequency of said modulating energy for current from said source to said indicator, the ratio of reactance to resistance of the electrical constants in one of said circuits being equal to that of the other whereby no change in indication of said indicator will occur with frequency variation in said modulating source.

4. In a directional receiving system, antenna means, a source of modulating energy associated with said antenna means for periodically reversing the current effects of said antenna means, a receiving circuit coupled to said antenna means, a circuit associated with the output of said receiving circuit, an indicator operatively responsive to said antenna effects, said indicator comprising a needle and spring means operatively connected to said needle for normally maintaining the same in zero center position, and a circuit for transmitting current from said source to said indicator, one of said circuits including said spring means as a part thereof and having the ratio of reactance to resistance of the electrical constants therein equal to that of the other circuit whereby no change in indication of said indicator will occur with frequency variation in said modulating source.

5. In a directional receiving system, antenna means, a source of modulating energy associated with said antenna means for periodically reversing the current effects of said antenna means, a receiving circuit coupled to said antenna means, a circuit associated with the output of said receiving circuit, an indicator operatively responsive to said antenna effects, said indicator comprising a needle and spring means operatively connected to said needle for normally maintaining the same in zero center position, a circuit for transmitting current from said source to said indicator, one of said circuits including said spring means as a part thereof and having the ratio of reactance to resistance of the electrical constants therein equal to that of the other circuit whereby no change in indication of said indicator will occur with frequency variation in said modulating source, and means associated with one of said circuits for limiting the torque of the combined effects of said currents to a value that is not greater than the torque of said spring means.

6. In a directional receiving system, antenna means, a source of modulating energy associated with said antenna means for periodically reversing the current effects of said antenna means, a receiving circuit coupled to said antenna means, a circuit associated with the output of said receiving circuit and tuned to the frequency of the modulating energy, an indicator operatively responsive to said antenna effects, said indicator comprising a needle and spring means operatively connected to said needle for normally maintaining the same in zero center position, a circuit tuned to the frequency of the modulating energy for transmitting current from said source to said indicator, one of said circuits including said spring means as a part thereof and having the ratio of reactance to resistance of the electrical constants therein equal to that of the other circuit whereby no change in indication of said indicator will occur with frequency variation in said modulating source, and means associated with one of said circuits for limiting the torque of the combined effects of said currents to a value that is less than the torque of said spring means.

7. In a directional antenna system comprising, a directional antenna means, non-directional antenna means, a reversing circuit having two circuit branches alternately operative and associated with one of said antenna means for periodically reversing the phase thereof, a receiving circuit, variable inductive coupling means between each of said circuit branches and the other antenna means and said receiving circuit for rendering the combined radio frequency energy transfer of both said antenna means in said receiving circuit substantially equal to thereby obtain null points 180° apart over an extended frequency range.

8. In a directional receiving system comprising, an antenna circuit having an electromotive force and a current of given frequency, amplitude and phase and having a non-directional characteristic, said current being materially out of phase with said electromotive force, a second antenna circuit having an electromotive force differing in phase from the electromotive force of said first-mentioned circuit and with a current of like frequency, but variable in phase and amplitude with respect to the second-mentioned electromotive force and having a directional characteristic, a receiving circuit tunable over a substantial frequency range, a reversing circuit having two circuit branches associated with one of said antenna circuits and coupled with said receiving circuit and the other antenna circuit for periodically reversing the phase of the combined effects of said antenna circuits in said receiving circuit and in such manner that the reactance of one of said antenna circuits may be varied without materially affecting the reactance of the other antenna circuit, the ratio of the mutual inductances existing between the respective branch circuits and said other antenna circuit and said receiving circuit being such that the energy transfers of said antennae to said receiving circuit is substantially equal during successive half cycles of the reversing means to thereby provide null points 180° apart over an extended frequency range.

9. A directional antenna system, antenna means having directional and non-directional characteristics, a balanced modulator circuit having a source of oscillating energy differing in frequency from that received by said antenna means and having its input circuit similarly associated with said antenna means and with said source of energy for periodically reversing the phase of the currents having one of said characteristics and having output self-inductances, a collective circuit and having self inductances, the self inductances of one of said circuits being inductively associated in opposition and being coupled to the self inductances of the other circuit and being further coupled with said antenna means for combining the modulated antenna effects and the other of said antenna effects, and means connected with said collective circuit for utilizing the energy flowing therein.

10. In an antenna system, antenna means having directional and non-directional effects, a source of oscillating energy differing in frequency from that of said antenna means, a pair of translating circuits similarly coupled to said antenna means and to said oscillating source at its input to translate one of said antenna effects, said translating circuits having self-inductances at their outputs inductively associated in opposition, a collective circuit having self-inductances connected in series and coupled in series-aiding relation with said output inductances and being further coupled with said antenna means to combine therein the translated antenna effects and the other of said antenna effects, and means connected with said collective circuit for utilizing the energy flowing therein.

11. In an antenna system, antenna means having directional and non-directional characteristics, a source of oscillating energy differing in frequency from that received by said antenna means, a pair of translating circuits similarly coupled at its input to said antenna means and to said oscillating source to translate one of said antenna effects, said translating circuits having self-inductances in their outputs inductively associated in opposition, a collective circuit having self-inductances connected in series and adjustably coupled in series-aiding-relation with said output inductances, and being further coupled with said antenna means to combine therein the translated antenna effects and the other of said antenna effects, and means connected with said collective circuit for utilizing the energy flowing therein.

12. In a directional antenna system, a directional antenna, a non-directional antenna, a collective circuit, coupling means for transferring the current effects of said antennae to said collective circuit, said means including a balanced modulator circuit having a source of oscillating energy differing in frequency from that received by said antennae and having its input circuit similarly associated with one of said antennae and with said source of energy for periodically reversing the phase of the effects thereof in said collective circuit and having self-inductances inductively associated in opposition in its output circuit, said collective circuit having self-inductances connected in series and coupled in series-aiding-relation with said output inductances, and being further coupled to said other antenna to combine the effects of both of said antennae therein, and means differentially connected with said collective circuit for utilizing the energy flowing in said collective circuit for producing indications.

13. In an antenna system, antenna means having directional and non-directional characteristics, a source of oscillating energy differing in frequency from that received by said antenna means, a pair of translating circuits similarly coupled at its input to said antenna means and to said oscillating source to translate one of said antenna effects, said translating circuits having self-inductances in their outputs inductively associated in opposition, a collective circuit having self-inductances connected in series and variably coupled in series-aiding-relation with said output inductances, and being further coupled with said antenna means to combine therein the translated antenna effects and the other of said antenna effects, and means differentially connected with said collective circuit for utilizing the energy flowing therein.

14. In an antenna system, antenna means having directional and non-directional effects, a source of oscillating energy differing in frequency from that of said antenna means, a pair of translating circuits similarly coupled to said antenna means and to said oscillating source at its input to translate one of said antenna effects, said translating circuits having self-inductances at their outputs inductively associated in opposition, a collective circuit having self-inductances connected in series and coupled in series-aiding-relation with said output inductances and being further coupled with said antenna means to combine therein the translated antenna effects and the other of said antenna effects, and means connected with at least one pair of said associated output and collective circuit inductances for utilizing the energy flowing therein.

15. In a directional antenna system, a directional antenna circuit, a non-directional antenna circuit, a balanced modulating circuit, a source of oscillating energy differing in frequency from that received by said antenna circuits, a pair of translating circuits similarly coupled at its input to one of said antenna circuits and to said oscillating source to translate the effects of one of said antennae, said translating circuits having self-inductances in their outputs inductively associated in opposition, a collective circuit connected with said other antenna circuit and having self-inductances connected in series with respect to each other and in series-aiding-relation with respect to said output inductances, said output inductances and said collective circuit inductances being coupled in variably adjusted relation whereby the combined effects in the collective circuit of one branch and said other antenna circuit is made substantially equal to that of the other branch and said other antenna circuit.

16. In a directional antenna system, a directional antenna circuit, a non-directional antenna circuit, a balanced modulating circuit, a source of oscillating energy differing in frequency from that received by said antenna circuits, a pair of translating circuits similarly coupled at its input to one of said antenna circuits and to said oscillating source to translate the effects of one of said antennae, said translating circuits having self-inductances in their outputs inductively associated in opposition, a collective circuit connected with said other antenna circuit and having self-inductances connected in series with respect to each other and in series-aiding-relation with respect to said output inductances, said output inductances and said collective circuit inductances being coupled in variably adjusted relation whereby the combined effects in the collective circuit of one branch and said other antenna circuit is made substantially equal to that of the other branch and said other antenna circuit, the constants and arrangements of said circuits being such that the phase of the effects of one of said antenna circuits may be varied without materially affecting the phase of the effects of said other antenna circuit to thereby obtain an in-phase relation of the effects of said antenna circuits over an extended frequency range.

17. A directional receiving apparatus comprising, a directional antenna circuit, a non-directional antenna circuit, one of said circuits having a self-inductance, a balanced modulating circuit connected at its input with the other antenna circuit and having a source of oscillating energy differing in frequency from that received by said antenna circuits and being coupled thereto in such manner that the carrier frequency is substantially suppressed and having a self-inductance in each branch of its output circuits, said branch circuit self-inductances being commonly coupled with said antenna circuit inductance, and a receiving circuit having a self-inductance coupled in differentially adjusted relation with respect to said common coupling.

18. A directional receiving apparatus comprising, a directional antenna circuit, a non-directional antenna circuit, a balanced modulating circuit connected at its input with one of said antenna circuits and having a source of oscillating energy differing in frequency from that received by said antenna circuits, a coupling arrangement between said balanced modulating circuit and said antenna circuit being such that the carrier frequency is substantially suppressed and that side-band frequencies are present in the divided output circuit, and a receiving circuit associated with said divided output circuit and with said other antenna circuit in such a manner that said receiving circuit is commonly coupled to said divided output circuit, collectively, and differentially coupled thereto, individually, and is coupled serially with said last-mentioned antenna circuit.

19. A directional antenna system for transmitting or receiving comprising, an antenna having a directional characteristic, another antenna having a non-directional characteristic, a reversing means associated with one of said antennae for alternately periodically obtaining a reversal of the effects thereof, a tuning element associated with one of said antennae for varying the effects thereof, a collective circuit having a tunable element, means connecting said tuning elements to operate in unison, said antennae and said collective circuit being coupled and having such constants and arrangements that for each adjustment of said tuning elements the effects of the currents of said antennae are brought substantially into phase in said collective circuit during successive half cycles of said reversing means and in such manner that the successive combined radio frequency energy transfers of said antennae to said collective circuit are substantially equal to thereby obtain two null points substantially 180° apart over an extended frequency range.

20. A directional antenna system for transmitting or receiving comprising, an antenna having a directional characteristic, another antenna having a non-directional characteristic, a reversing means comprising two branch circuits associated with one of said antennae for alternately periodically obtaining a reversal of the effects thereof, a tuning element associated with one of said antennae for varying the effects thereof, a collective circuit having a tunable element, means connecting said tuning elements to operate in unison, said branch circuits being respectively variably inductively coupled to said other antenna and said collective circuit, the constants and arrangements of said respective coupling being such that for such adjustment of said tuning elements the effects of the currents of said antennae are brought substantially into phase in said collective circuit during successive half cycles of said reversing means and in such manner that the successive combined radio frequency energy transfers of said antennae are substantially equal to thereby obtain two null points substantially 180° apart over an extended frequency range.

21. In a directional receiving system, antenna means, reversing means for periodically reversing the current effects of said antenna means including a source of modulating energy, a receiver coupled at its input to said reversing means, an indicator, a circuit connecting said indicator to the output of said receiver, a common source of potential connected with said receiver and said source of modulating energy whereby the current of said modulating source is permitted to flow to said indicator, another circuit for transmitting current from said source of modulating energy to said indicator, and filter means for limiting the flow of current from said modulating source to said indicator through said common source of potential to thereby reduce the undesirable combined effects of said currents in said indicator.

22. In a radio compass for operating at any selected frequency of a given range of signal frequencies, a directional antenna system, a collector circuit, means for setting up in said collector circuit a plurality of currents derived from said antenna system and for causing said currents throughout said given frequency range to be either substantially in phase with each other, or substantially 180° out of phase, depending upon the direction in which the signal deviates from a given zero axis, said means comprising a plurality of paths from said antenna system to said collector circuit, phase adjusting means for adjusting the relative phase relationship of the currents in said paths, a periodic reversing means for causing the periodic reversal of the current of one of said paths, the coupling between said paths, as compared to the coupling between said paths and said collector circuit respectively, being sufficiently small to permit of accuracy in such phase adjustment for any selected frequency of said frequency range; the coupling between said paths and said collector circuit being comprised of a plurality of coils, one in each path, and one in said circuit, the coil of one of said paths being divided into a plurality of parts, said coils being so constructed and arranged with reference to each other that the coupling co-efficient from the coil of the other of said paths to the divided coil of said one path is substantially less than the coupling co-efficient between said coil of said other path and the coil of the collector circuit and also substantially less than the coupling co-efficient between each part of the divided coil and the coil of the collector circuit, the divided coil of said one path being arranged symmetrically with reference to the coil of said other path and with reference to the coil of said collector circuit, said coil of said other path being disposed intermediate the portions of said divided coil, and being relatively movable co-axially with respect to said divided coil, for the purpose of rendering the total energy transfer from the portions of said divided coil to said coil of the collector circuit equal during successive periods of reversal of said periodic reversing means, tuning means for causing said collector circuit to be effective at any selected frequency of said given frequency range; a single controlling device for operating said phase adjusting means, and said tuning means in unison, so that the compass may be rendered accurately effective for any frequency in said given range by the manipulation of said single controlling device, the constants and arrangements of the circuits of which said phase adjusting means and said tuning means constitute parts, being such that over said given frequency range a change in the setting of said single controlling device from one frequency position to any other will serve to render the collector circuit effective and simultaneously change the constants of the circuit comprising said phase adjusting means in such manner that, at such other new setting of said controlling device the currents set up in said collector circuit will again be either substantially in phase with each other or 180° out of phase, and means whereby said currents in said collector circuit are caused to provide a visual indication of the direction in which the signal deviates from said given zero axis.

23. In a radio compass for operating at any selected frequency of a given range of signal frequencies, a directional antenna system, said directional system comprising a straight antenna and a loop, a collector circuit, means for setting up in said collector circuit a plurality of currents derived from said antenna system and for causing said currents throughout said given frequency range to be either substantially in phase with each other, or substantially 180° out of phase, depending upon the direction in which the signal deviates from a given zero axis, said means comprising a plurality of paths from said antenna system to said collector circuit, a balanced modulator of the common input type interposed in the path between the loop and the collector circuit, the output side of said modulator comprising a first pair of coils connected in opposition, the path from the straight antenna to the collector circuit comprising a second pair of coils connected in series aiding relation, said second pair of coils being interposed between the first pair of coils, said collector circuit comprising a coil unsymmetrically interposed between said second pair of coils, said first pair of coils being adjustable longitudinally with reference to the second pair of coils so as to vary the coupling co-efficient between said pairs respectively, whereby the energy transfer from said loop to said collector circuit may be equalized during successive periods of reversal during the operation of said modulator, phase adjusting means for adjusting the relative phase relationship of the currents in said paths, the coupling between said paths, as compared to the coupling between said paths and said collector circuit respectively, being sufficiently small to permit of accuracy in such phase adjustment for any selected frequency of said frequency range; tuning means for causing said collector circuit to be effective at any selected frequency of said given frequency range; a single controlling device for operating said phase adjusting means, and said tuning means in unison, so that the compass may be rendered accurately effective for any frequency in said given range by the manipulation of said single controlling device, the constants and arrangements of the circuits of which said phase adjusting means and said tuning means constitute parts, being such that over said given frequency range a change in the setting of said single controlling device from one frequency position to any other will serve to render the collector circuit effective and simultaneously change the constants of the circuit comprising said phase adjusting means in such manner that, at such other new setting of said controlling device the currents set up in said collector circuit will again be either substantially in phase with each other or 180° out of phase; and means whereby said currents in said collector circuit are caused to provide a visual indication of the direction in which the signal deviates from said given zero axis.

24. In a radio compass for operating at any selected frequency of a given range of signal frequencies, a directional antenna system, a collector circuit, means for setting up in said collector circuit a plurality of currents derived from said antenna system and for causing said currents throughout said given frequency range to be either substantially in phase with each other, or substantially 180° out of phase, depending upon the direction in which the signal deviates from a given zero axis, said means comprising a plurality of paths from said antenna system to said collector circuit, a balanced modulator interposed in one of said paths, said modulator having a source of modulating energy, phase adjusting means for adjusting the relative phase relationship of the currents in said paths, the coupling between said paths, as compared to the coupling between said paths and said collector circuit respectively, being sufficiently small to permit of accuracy in such phase adjustment for any selected frequency of said frequency range; tuning means for causing said collector circuit to be effective at any selected frequency of said given frequency range; a single controlling device for operating said phase adjusting means, and said tuning means in unison, so that the compass may be rendered accurately effective for any frequency in said given range by the manipulation of said single controlling device, the constants and arrangements of the circuits of which said phase adjusting means and said tuning means constitute parts, being such that over said given frequency range a change in the setting of said single controlling device from one frequency position to any other will serve to render the collector circuit effective and simultaneously change the constants of the circuit comprising said phase adjusting means in such manner that, at such other new setting of said controlling device the currents set up in said collector circuit will again be either substantially in phase with each other or 180° out of phase; and means whereby said currents in said collector circuit are caused to provide a visual indication of the direction in which the signal deviates from said given zero axis, said means comprising an indicator provided with a plurality of input circuits and a detector interposed between said collector circuit and one of said input circuits of said indicator, the other of said input circuits being energized by the source of modulating energy of the balanced modulator, the ratio of reactance to resistance of one of said input circuits being equal to that of the other, whereby no change in indication of said indicator will occur with frequency variation of said modulating source.

25. In a radio compass for operating at any selected frequency of a given range of signal frequencies, a directional antenna system, a collector circuit, means for setting up in said collector circuit a plurality of currents derived from said antenna system and for causing said currents throughout said given frequency range to be either substantially in phase with each other, or substantially 180° out of phase, depending upon the direction in which the signal deviates from a given zero axis, said means comprising a plurality of paths from said antenna system to said collector circuit, a balanced modulator interposed in one of said paths, said modulator having a source of modulating energy, phase adjusting means for adjusting the relative phase relationship of the currents in said paths, the coupling between said paths, as compared to the coupling between said paths and said collector circuit respectively, being sufficiently small to permit of accuracy in such phase adjustment for any selected frequency of said frequency range; tuning means for causing said collector circuit to be effective at any selected frequency of said given frequency range; a single controlling device for operating said phase adjusting means, and said tuning means in unison, so that the compass may be rendered accurately effective for any frequency in said given range by the manipulation of said single controlling device, the constants and arrangements of the circuits of which said phase adjusting means and said tuning means constitute parts, being such that over said given frequency range a change in the setting of said single controlling device from one frequency position to any other will serve to render the collector circuit effective and simultaneously change the constants of the circuit comprising said phase adjusting means in such manner that, at such other new setting of said controlling device the currents set up in said collector circuit will again be either substantially in phase with each other or 180° out of phase; and means whereby said currents in said collector circuit are caused to provide a visual indication of the direction in which the signal deviates from said given zero axis, said means comprising an indicator provided with a plurality of input circuits and a detector interposed between said collector circuit and one of said input circuits of said indicator, the other of said input circuits being energized by the source of modulating energy of the balanced modulator, the ratio of reactance to resistance of one of said input circuits being equal to that of the other, whereby no change in indication of said indicator will occur with frequency variation of said modulating source; each of said input circuits being tuned to the frequency of the modulating source to increase the sensitivity of said indicator; and to render the same non-responsive to stray currents of frequencies other than that to which said input circuits are tuned.

26. A modulating system comprising a pair of translating circuits inductively associated at their inputs and inductively associated in opposition at their outputs, different sources of different oscillating energy similarly connected with said circuits at their inputs, an independent circuit inductively coupled in series-aiding-relation with the outputs of said translating circuits and a receiving circuit differentially connected to said independent circuit.

27. A modulating system comprising a balanced modulator circuit of the non-conjugate input type having self-inductances inductively associated in opposition in the plate series paths, an independent circuit coupled to said inductances in series-aiding-relation and a receiving circuit differentially associated with said independent circuit.

28. A modulating system comprising a balanced modulator circuit of the non-conjugate input type having self-inductances inductively associated in opposition in the plate series paths, an independent circuit having self-inductances associated with the corresponding inductances of said series paths in series-aiding-relation, and a receiving circuit differentially associated with said independent circuit.

29. A modulating system comprising a balanced circuit all of the carrier suppression type, said circuit having a self-inductance in each branch of its output circuits, a generating circuit having a self-inductance, and a receiving circuit having a self-inductance, said last two mentioned self-inductances being coupled in variably adjusted relation with respect to each other and in differentially adjusted relation with respect to said first-mentioned self-inductances whereby the combined effects in the receiving circuit of one branch and said generating circuit is made substantially equal to that of the other branch and said generating circuit.

30. A modulating system comprising a balanced circuit all of the carrier suppression type, said circuit having a self-inductance in each branch of its output circuits, a generating circuit having a self-inductance commonly coupled to said first-mentioned inductances, and a receiving circuit having a self-inductance coupled in differentially adjusted relation with respect to said common coupling.

31. A modulating system comprising a balanced circuit of the carrier suppression type having divided output circuits in which side band frequencies are present, a generating circuit, a receiving circuit coupled with said divided output circuits and with said generating circuit, one of said last two mentioned circuits being in a fixed coupling relationship with each of said divided output circuits and the other being coupled in differentially adjustable manner with respect to said divided output circuits.

32. A modulating system comprising a balanced circuit all of the carrier suppression type having divided output circuits in which side band frequencies are present, a generating circuit and a receiving circuit connected with said divided output circuits and with said generating circuit, said receiving circuit being coupled in differentially adjusted relation with said output circuits collectively, in adjustable relation with said output circuits individually, and in series relation with said generating circuit and said output circuits respectively.

33. In a directional receiving system, antenna means, reversing means for periodically reversing the current effects of said antenna means including a source of modulating energy, a radio receiver coupled at its input to said reversing means, an indicator, a circuit connecting said indicator to the output of said receiver, a common source of positive potential connected to energize said radio receiver and said source of modulating energy whereby the current of said modulating source is permitted to flow to said indicator, another circuit for transmitting current from said source of modulating energy to said indicator, and a filter comprising a circuit tuned to the frequency of said modulating energy arranged to limit the flow of current from said modulating source to said indicator through said common source of potential to thereby reduce the undesirable combined effects of said currents in said indicator.

34. A modulating system comprising a balanced circuit of the carrier suppression type, said circuit having a self-inductance in each branch of its output circuit, a generating circuit having a self-inductance, and a receiving circuit having a self-inductance coupled with said last-mentioned inductance and in variably adjusted relation with respect to either of said first-mentioned inductances.

GOEFFREY GOTTLIEB KRUESI.